Dec. 7, 1965   H. F. IRVING   3,221,879
CENTRIFUGING APPARATUS
Filed Oct. 18, 1962   2 Sheets-Sheet 1

INVENTOR.
HENRY F. IRVING
BY
Learman, Learman, & McCulloch
ATTORNEYS

United States Patent Office 3,221,879
Patented Dec. 7, 1965

3,221,879
CENTRIFUGING APPARATUS
Henry F. Irving, Saginaw, Mich., assignor to Baker Perkins Inc., Saginaw, Mich., a corporation of New York
Filed Oct. 18, 1962, Ser. No. 231,340
5 Claims. (Cl. 210—106)

This invention relates to centrifuging apparatus for separating liquid and solid components of mixtures containing such components, and more particularly the invention pertains to the continuous separation of granular, fibrous or crystalline solids from liquids containing them.

An object of this invention is to provide highly reliable and efficient centrifugal apparatus which minimizes breakage of crystalline solids during separation of such solids from the liquid in which they are contained.

Another object of the invention is to provide centrifugal apparatus in which washing can be accomplished more effectively and also the likelihood of caked solids being washed inadvertently out of the collecting screen is minimized.

A further object of the invention is to provide a machine for separating and collecting solids from liquids which eliminates the cake humping problem and permits the employment of baskets of increased length.

Figure 1:
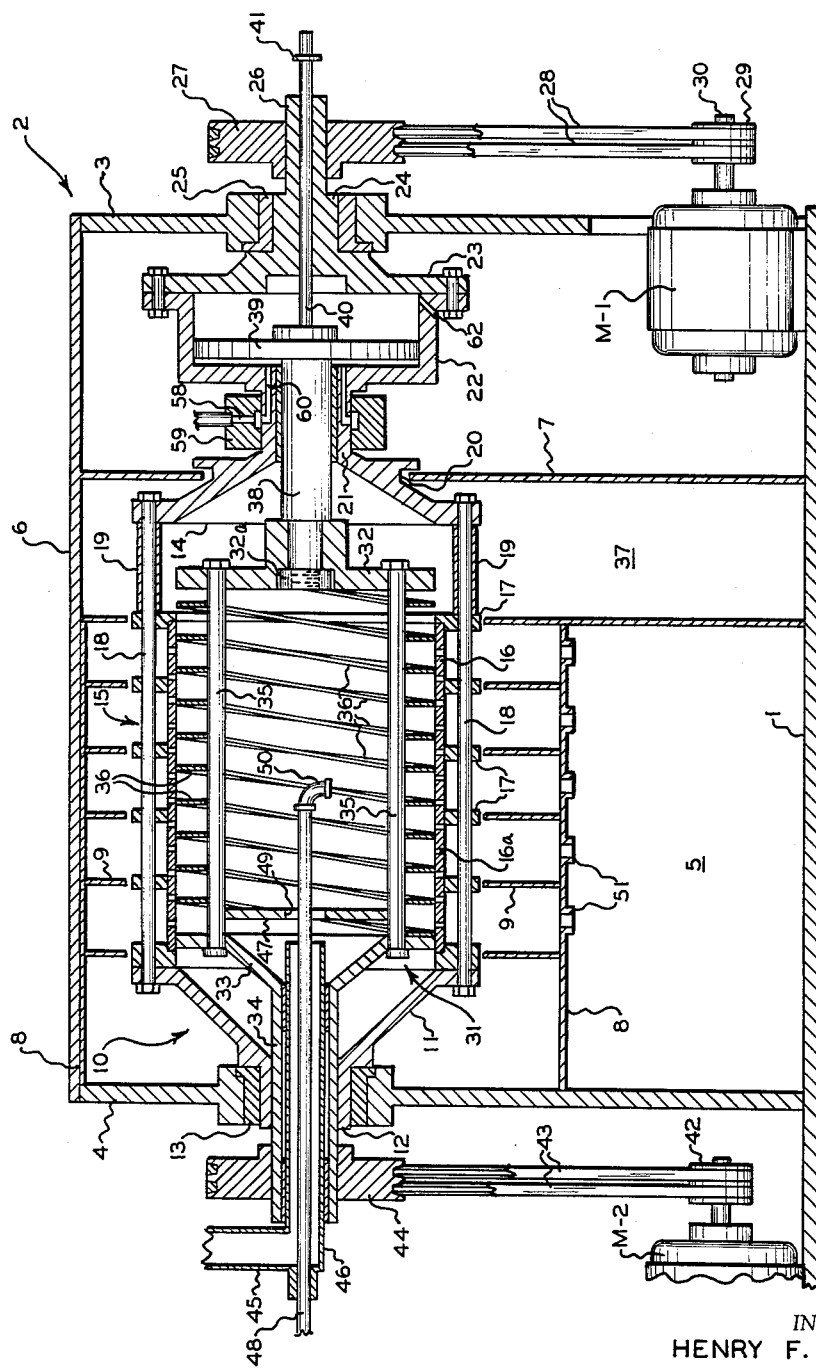
Figure 2:
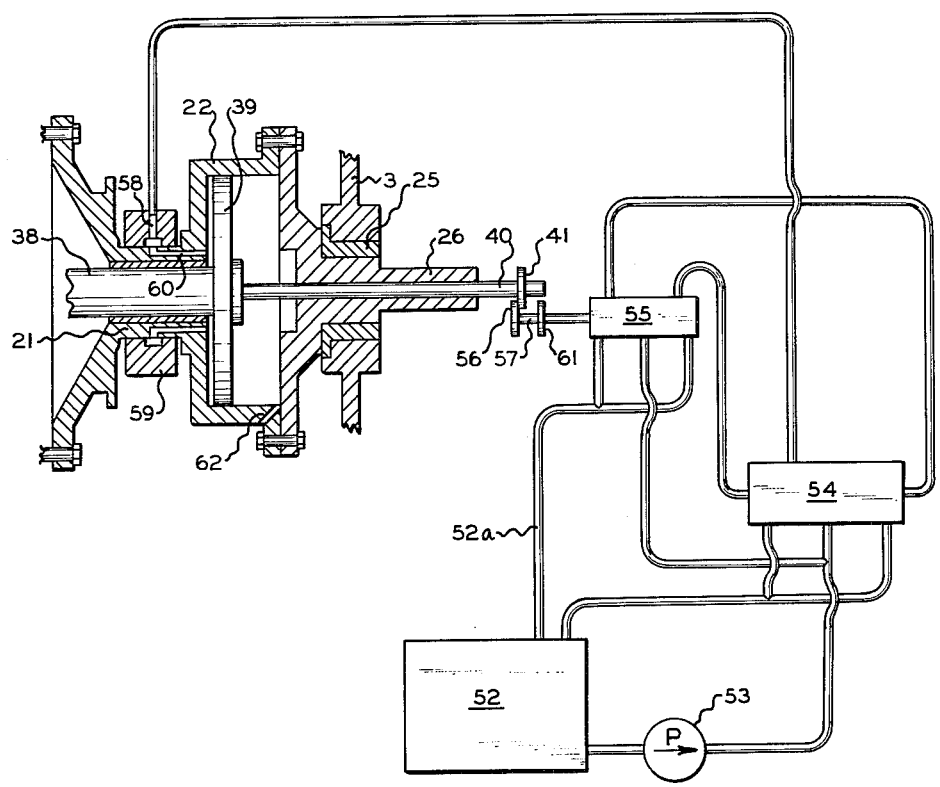

Other objects and advantages of the invention will be pointed out specifically or will become apparent from the following description when it is considered in conjunction with the appended claims and the accompanying drawings, in which:

FIGURE 1 is a transverse, sectional view of a centrifugal apparatus constructed in accordance with the invention; and FIGURE 2 is a diagrammatic view of a pressure fluid system for operating certain parts of the apparatus.

Apparatus constructed in accordance with the invention comprises a base 1 on which is supported a housing 2 composed of end walls 3 and 4, side walls 5, and a top wall 6. Between the end walls 3 and 4 is a partition 7 which separates the housing into two compartments. The upper part of the compartment between the end wall 4 and the partition 7 preferably includes a cylindrical shell 8 having a plurality of annular rings 9 fixed on its inner periphery for a purpose presently to be described.

Rotatably mounted in the housing 2 is a basket member generally designated 10 comprising a generally conical end bell 11 having a tubular extension 12 that is journaled in a bearing 13 supported by the housing end wall 4. The basket terminates at its other end in another generally conical end bell 14 which is supported by end wall 3 in a manner to become apparent. Between the bell housings 11 and 14 is a generally cylindrical cage 15 comprising a perforate annular wall 16 to which is secured a plurality of annular rings 17 having openings therein to receive elongated bolts 18 which serve to maintain the bell housings and the cage in assembled relation. The basket 15 may be replaced by other baskets of different size. To permit such substitution and to maintain any size basket assembled with the end bell housings, suitable length spacer sleeves 19 may be interposed between the bell housing 14 and the right end ring 17 in FIGURE 1.

As is illustrated in FIGURE 1, the end bell housing 14 extends through an opening 20 formed in the partition 7 and is suitably connected to one end of a tubular shaft 21, the opposite end of which terminates in a piston cylinder 22. To the cylinder 22 is bolted or otherwise suitably secured a head member 23 from which extends a shaft 24 that is journaled in a bearing 25 supported by the housing end wall 3. The shaft 24 terminates in a reduced end section 26 on which is fixed a pulley 27. The pulley 27, the cylinder 22 and the basket 15 are rotated by means of belts 28 trained around the pulley 27 and around a pulley 29 that is fixed to the armature shaft 30 of a driving motor M–1 which may be supported on the base 1.

Apparatus constructed in accordance with the disclosed embodiment of the invention includes a scroll member generally designated 31 terminating at one end in a circular plate 32 and at the other end in a conical shell 33. Fast with the shell 33 is a tubular stem 34 that is rotatably and slideably mounted within the shaft 12. Secured to and interposed between the members 32 and 33 is a cage comprising a plurality of circumferentially spaced rods 35 which are anchored at their ends to the members 32 and 33, respectively. Fixed to the rods 35 is a helically arranged, continuous blade or flight 36 of such width as to lie proximate the inner surface of the perforate wall 16 in scraping relation therewith. The pitch of the blade 36 may vary according to the particular material being treated, but the hand of the helical blade should be such that rotation of the scroll member 31 relative to the basket 15 in a clockwise direction, as viewed from the right-hand end of FIGURE 1, will cause material to be fed toward the right for discharge to and through a solids collecting chute 37 that is supported at the right-hand end of the basket 15 by the wall members 7 and 8.

The scroll disk 32 is fixed as at 32a to one end of a shaft 38 that is rotatably and slideably mounted within the shaft 21. The opposite end of the shaft 38 is fixed to a piston or ram 39 which is reciprocably and rotatably received within the cylinder 22. Also fixed to the piston 39 is a rod 40 that extends through an opening formed in the shaft sections 24 and 26. Adjacent the free end of the rod 40 is a ring or projection 41, the purpose of which will be explained hereinafter.

Means is provided for rotating the scroll member 31 independently of the basket 15 and comprises a motor M–2 having a driving pulley 42 that is belted as at 43 to a pulley 44 which is fixed to the shaft 34. The motor M–2 is capable of driving (is rated to drive) the scroll member 31 in the same direction of rotation as the basket 15, but at a higher speed than the latter, so as to enable the scroll member to rotate relatively to the basket. Both motors M–1 and M–2 are conventional electric motors with motor M–2 having a slip factor. The motor M–2 preferably developes less torque than the motor M–1, whereby the speed of the motor M–2 is more changeable in response to the imposition of load. The greater sensivity to load of the motor M–2 readily may be obtained by the use of a conventional slip motor as noted or a synchronous motor or, if desired, a torque clutch of conventional construction may be incorporated in the motor M–2.

Means is provided for introducing to the scroll member a slurry or mixture containing liquid and solid components. The supply means may comprise a pipe 45 having one of its ends in communication with a hopper (not shown) and its other end joined to a pipe section 46 that extends through the shaft 34 into the interior of the scroll 31. Adjacent the discharge end of the pipe 46 a barrier disk or plate 47 is fixed to the rods 35 so as to assure that all of the mixture discharged from the pipe 46 will be introduced to the basket 15 at the extreme left-hand end of the latter.

A wash pipe 48 extends through the pipe 46 and has one of its ends connected to a source of wash liquid. The other end of the pipe 48 extends through an opening 49 in the plate 47 and is provided with a nozzle 50 that is located within the scroll 31 in such position as to enable wash liquid to be sprayed on the contents of the basket 15.

In the preferred method of operation, the scroll member 31 initially is adjacent the right-hand end of the basket 10 and rotates in the same direction as the latter but at a slightly higher speed, so as to rotate relatively to the basket. A mixture of liquid and solid components is introduced to the basket through the delivery pipe 46. The perforations 16a in the basket wall are of such size as to pass liquid therethrough, but of insufficient size to pass the particular solid components being separated. As a result, the liquid components are discharged through the annular wall 16 to the shell 8. The annular flanges 9 on the shell prevent splashing of the liquid and direct the latter to drain openings 51 provided at the bottom of the shell.

As slurry is first charged to the basket (it being assumed for purposes of this discussion that the piston 39 is in the right end of cylinder 22), solids are deposited on the inner surface of the basket wall 16, and there is a relative rotation between the basket and the scroll which causes the blade 36 on the latter to exert a force on the deposited solids tending to scrape or move them toward the right-hand end of the basket. As the amount of solids deposited increases, the solids exert a reactive force on the scroll blade opposing the scraping force exerted thereby on the scroll. Eventually, the force required to move the solids relatively to the basket becomes greater than the force required to cause the scroll to move axially of the basket toward the left-hand end of the latter, there being no pressure in cylinder 22 to resist this movement, as will later appear. At this stage of the operation the caked solids act as a mechanical thread and react with the blades 36 to effect axial movement of the scroll toward the left-hand end of the basket.

Upon movement of the scroll 31 axially of the basket to its extreme left-hand position, the piston is actuated in a manner to be described to reverse the direction of axial movement of the scroll and cause it to move axially of the basket in the opposite direction. During this movement of the scroll the caked solids bear against the blades 36 with such force as to slow the rotation of the scroll member to a speed equal to the speed of rotation of the basket, thereby terminating relative rotation of the members 15 and 31. When the piston reaches the right end of its travel the pressure in the cylinder 22 is relieved and the resistance of the solids returns the scroll to the left again, the cake acting as a thread. This occurs because the motor M-2 is capable of driving the scroll at its normal, faster rate of speed so as to enable it to thread itself into the basket and move toward the left-hand end of the latter. Continued actuation of the piston as described causes the caked solids to be displaced axially of the basket so as to discharge from the basket at the right-hand end of the basket.

The power stroke of the ram 39 has a length corresponding to or somewhat greater than the distance between adjacent convolutions of the blade 36. As a consequence, the left-hand end of the basket is maintained relatively free of solids for reception of the incoming slurry.

The means for operating the piston 39 is best disclosed in FIGURE 2 and comprises a reservoir 52 of hydraulic fluid from which a pump 53 withdraws fluid for delivery to a four-way valve 54 of the kind illustrated in United States Patent No. 2,899,065, for example. Except when the ram 39 is actuated, fluid delivered to the valve 54 is circulated through a control valve 55 of the kind that also is disclosed in the aforementioned patent, and is returned to the reservoir 52. When the scroll member 31 reaches its extreme left-hand position, however, the ring 41 on the shaft 40 engages a stop 56 on a slide 57 forming part of the valve 55 and shifts the slide to direct fluid into the valve 54 from which the fluid is delivered to the interior of the cylinder 22 via a passage 58 formed in a stationary collar 59 and which communicates with a passage 60 provided in the shaft 21. Introduction of fluid to the cylinder 22 moves the piston 39 toward the right a predetermined distance at which point the ring 41 engages a second stop 61 on the valve slide 57 and returns the latter to its original position. In this position of the valve slide, the cylinder 22 communicates through the valve 55 and line 52a with the reservoir 52 and is therefore disabled. The cylinder 22 is vented to atmosphere by a passage 62, thereby enabling the sealed piston 39 to move toward the left in response to corresponding movement of the scroll.

Discharging of the cake by axial movements of the scroll avoids uneven dispersion of the solids within the basket and minimizes breakdown of the crystalline structure of crystalline solids. Moreover, such discharge of the cake avoids excessive wear on the blades 36 and on the basket wall.

The disclosed apparatus is representative of preferred embodiments of the invention, but is intended to be illustrative rather than definitive thereof. The invention is defined in the claims.

What is claimed is:

1. A centrifugal machine comprising a cylindrical basket member having a perforate annular wall; a generally cylindrical scroll member having helical flights thereon; means mounting said scroll member within said basket member for rotative and axial movements relative thereto and with said helical flights in scraping relation therewith over the full length of said flights; means for introducing to said basket member a slurry containing solid and liquid components; driving means connected at least to one of said members for effecting relative rotation therebetween in such direction as to enable said flights to engage and apply a force on solid components of said slurry tending to move them toward one end of said basket member, said mounting means including means enabling axial movement of said scroll member relative to said basket member toward the other end of said basket member in response to the application of reactive force of predetermined magnitude on said flights by said solid components; and power means connected to one of said members and operable in response to said relative axial movement of said members to effect axial movement of said scroll member relative to said basket member toward said one end of said basket member, whereby said flights may forcibly engage said solid components and shift them axially of said basket member toward said one end thereof.

2. A centrifugal machine comprising a cylindrical basket member having a perforate annular wall; a generally cylindrical scroll member having helical flights thereon; means mounting said scroll member within said basket member for rotative and axial movements relative thereto and with said helical flights in scraping relation therewith over the full length of said flights; means for introducing to said basket member a slurry containing solid and liquid components; driving means connected at least to one of said members for effecting relative rotation therebetween in such direction as to enable said flights to engage and apply a force on solid components of said slurry tending to move them toward one end of said basket member, said mounting means including means enabling axial movement of said scroll member relative to said basket member toward the other end of said basket member in response to the application of reactive force of predetermined magnitude on said flights by said solid components; power means connected to one of said members and operable in response to said relative axial movement of said members to effect axial movement of said scroll member relative to said basket member toward said one end of said basket member, whereby said flights may forcibly engage said solid components and shift them axially of said basket member toward said one end thereof; and control means connected to said power means and operable in response to predetermined axial movement of said scroll member relatively to said basket member toward said one end of the latter to disable said power means.

3. A centrifugal machine comprising a rotatable, cylindrical basket member having a perforate annular wall; a generally cylindrical scroll member having helical flights thereon; means mounting said scroll member within said basket member for rotative and axial movements relative thereto and with said helical flights in scraping relation therewith over the full length of said flights; means for introducing to said basket member a slurry containing solid and liquid components; first driving means connected to said basket member for rotating the latter; second driving means connected to said scroll member for driving the latter in such direction relative to the direction of rotation of said basket as to enable said flights to engage and apply a force on solid components of said slurry tending to move them toward one end of said basket member, the mounting means of one of said members including means enabling axial movement of said scroll member relative to said basket member toward the other end of the latter solely in response to the application of reactive force of predetermined magnitude on said flights by said solid components; and power means connected to one of said members and operable in response to to said relative axial movement of said members to effect axial movement of said scroll member relative to said basket member toward said one end of the latter, whereby said flights may forcibly engage said solid components and shift them axially of said basket member toward said one end thereof.

4. The apparatus set forth in claim 3 including control means connected to said power means and operable in response to predetermined axial movement of said scroll member toward said one end of said basket member to disable said power means.

5. A centrifugal machine comprising a rotatable, cylindrical basket member having a perforate annular wall; a generally cylindrical scroll member having helical flights; means mounting said scroll member within said basket member for movements axially of the latter and with said helical flights in scraping relation with said wall over the full length of said flights; means for introducing to the interior of said basket member a mixture containing liquid and solid components; driving means connected at least to said basket member for rotating the latter relatively to said scroll member at a speed to separate the solid and liquid components of said mixture by expelling the liquid components through said perforate wall and in a direction to enable said flights to exert force on said solid components tending to move them toward one end of said basket member, said mounting means including means enabling axial movement of said scroll member in a direction opposite to the first mentioned direction solely in response to a reactive force of predetermined magnitude being exerted by said solid components on said flights; power means connected to said scroll member and operable to move said scroll member axially in said one direction; and control means responsive to axial movement of said scroll member a predetermined distance in said opposite direction to operate said power means.

References Cited by the Examiner

UNITED STATES PATENTS

| | | | |
|---|---|---|---|
| 962,052 | 6/1910 | Roberts | 210—374 X |
| 1,903,795 | 4/1933 | Rigler | 210—213 |
| 2,114,778 | 4/1938 | Fillinger | 210—377 X |
| 2,462,098 | 2/1949 | Hertrich | 210—377 X |
| 2,600,372 | 6/1952 | Milliken et al. | |
| 2,867,378 | 1/1959 | Harlow | 210—374 XR |
| 2,899,065 | 8/1959 | Irving | 210—376 |

FOREIGN PATENTS

| | | |
|---|---|---|
| 1,005,617 | 12/1951 | France. |
| 1,114,741 | 10/1961 | Germany. |
| 1,119,173 | 12/1961 | Germany. |
| 590,969 | 8/1947 | Great Britain. |

ROBERT F. BURNETT, *Primary Examiner.*

HERBERT L. MARTIN, *Examiner.*